United States Patent
Rhee et al.

(10) Patent No.: US 9,916,689 B2
(45) Date of Patent: Mar. 13, 2018

(54) APPARATUS AND METHOD FOR ESTIMATING CAMERA POSE

(71) Applicant: Samsung Electronics Co., Ltd., Suwon-si (KR)

(72) Inventors: Seon Min Rhee, Seoul (KR); Seung In Park, Hwaseong-si (KR); Yong Beom Lee, Seoul (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 14/611,824

(22) Filed: Feb. 2, 2015

(65) Prior Publication Data

US 2015/0235378 A1   Aug. 20, 2015

(30) Foreign Application Priority Data

Feb. 17, 2014   (KR) .................. 10-2014-0017820

(51) Int. Cl.
| | |
|---|---|
| *G06T 19/00* | (2011.01) |
| *G06T 15/20* | (2011.01) |
| *G06F 3/0481* | (2013.01) |
| *G06F 3/0346* | (2013.01) |
| *G06T 7/73* | (2017.01) |

(52) U.S. Cl.
CPC .......... *G06T 19/006* (2013.01); *G06F 3/0346* (2013.01); *G06F 3/04815* (2013.01); *G06T 7/73* (2017.01); *G06T 15/20* (2013.01); *G06T 2200/04* (2013.01); *G06T 2207/10012* (2013.01); *G06T 2207/10024* (2013.01); *G06T 2207/10028* (2013.01); *G06T 2207/30244* (2013.01)

(58) Field of Classification Search
CPC . G06T 2207/30244; G06T 7/246; G06T 7/73; G06T 7/74; G06T 7/20; G06T 7/579; G06T 7/80

See application file for complete search history.

(56) References Cited

U.S. PATENT DOCUMENTS

| | | | |
|---|---|---|---|
| 8,633,970 B1 * | 1/2014 | Mercay ................. | G06T 19/006 345/633 |
| 2009/0154293 A1 | 6/2009 | Sengupta et al. | |
| 2012/0062702 A1 * | 3/2012 | Jiang ........................ | G06T 7/74 348/46 |
| 2012/0194644 A1 | 8/2012 | Newcombe et al. | |
| 2015/0071524 A1 * | 3/2015 | Lee ........................ | G06T 7/0075 382/154 |
| 2015/0103183 A1 * | 4/2015 | Abbott ................. | G01C 21/165 348/169 |
| 2015/0172626 A1 * | 6/2015 | Martini ................. | G06T 7/0008 348/50 |

FOREIGN PATENT DOCUMENTS

| | | |
|---|---|---|
| KR | 10-2007-0010352 A | 1/2007 |
| KR | 10-2012-0038616 A | 4/2012 |

* cited by examiner

*Primary Examiner* — Jeffrey Chow
(74) *Attorney, Agent, or Firm* — NSIP Law

(57) ABSTRACT

An apparatus for estimating a camera pose includes an image acquisition unit to acquire a photographed image, a motion sensor to acquire motion information of the apparatus for estimating the camera pose, a static area detector to detect a static area of the photographed image based on the photographed image and the motion information, and a pose estimator to estimate a camera pose based on the detected static area.

23 Claims, 26 Drawing Sheets

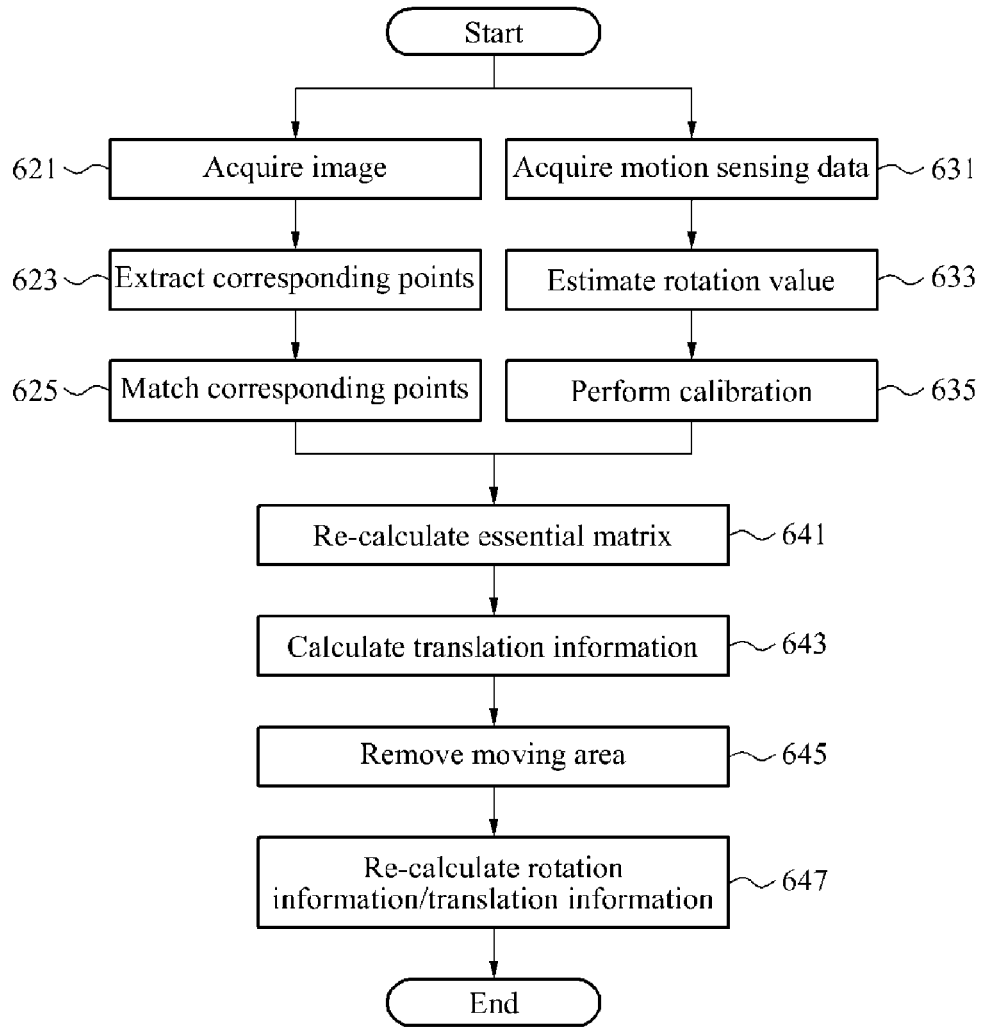

APPARATUS AND METHOD FOR ESTIMATING CAMERA POSE

CROSS-REFERENCE TO RELATED APPLICATIONS

This application claims the priority benefit of Korean Patent Application No. 10-2014-0017820, filed on Feb. 17, 2014, in the Korean Intellectual Property Office, the disclosure of which is incorporated herein by reference.

BACKGROUND

1. Field

Example embodiments of the following description relate to an apparatus and method for estimating a camera pose, and more particularly to, an apparatus and method for estimating a camera pose without using a marker.

2. Description of Related Art

In recent times, an augmented reality (AR) service is rapidly gaining popularity. The AR service refers to a service that provides additional information based on an actual image acquired by an electric device. For example, the AR service receives an input of an image including an object and provides information associated with the corresponding object.

The AR service may be classified into a global positioning system (GPS)-based AR service, a marker detection-based AR service, and a markerless AR service. The marker detection-based AR service is a service in which a reference object used as a standard is preset. In the marker detection-based AR service, a marker, for example, the preset reference object, is utilized to estimate a camera pose. However, when the marker deviates from a camera point of view, estimating of the camera pose is made unavailable.

The markerless AR service is a service in which such a preset reference object is absent. In the markerless AR service, a camera pose is estimated based on a scene photographed by a current camera rather than a predetermined object. Accordingly, when a moving object is included within the photographed scene, a problem arises in terms of estimating the camera pose.

SUMMARY

The foregoing and/or other aspects are achieved by providing an apparatus for estimating a camera pose, the apparatus including an image acquisition unit to acquire a photographed image, a motion sensor to acquire motion information of the apparatus for estimating the camera pose, a static area detector to detect a static area of the photographed image based on the photographed image and the motion information, and a pose estimator to estimate a camera pose based on the detected static area.

The image acquisition unit may acquire a first color image and a second color image.

The pose estimator may match corresponding points between the first color image and the second color image, and estimate a rotation value from the motion information.

The pose estimator may calibrate the estimated rotation value to correspond to a disposition in which the camera is at a position identical to the motion sensor.

The pose estimator may calculate an essential matrix based on a matching relationship between the matched corresponding points and the estimated rotation value, and estimate a translation value based on the calculated essential matrix.

The static area detector may detect the static area based on the estimated rotation value and the estimated translation value.

The static area detector may apply the estimated rotation value and the estimated translation value to the corresponding point of the first color image, and detect a predicted position of the corresponding point of the second color image.

The static area detector may detect an area in which a difference between the predicted position of the corresponding point of the second color image and an actual position of the corresponding point of the second color image is less than a predetermined threshold value to be a static area.

The image acquisition unit may acquire a first depth image and a second depth image.

The pose estimator may select a pair of three-dimensional (3D) points from the first depth image and the second depth image that satisfies the motion information acquired from the motion sensor.

The pose estimator may estimate a translation value based on the selected pair of 3D points.

The static area detector may apply the rotation value and the translation value to a 3D point of the first depth image, and estimate a predicted position of a 3D point of the second depth image.

The static area detector may detect an area in which a difference between the predicted position of the 3D point of the second depth image and an actual position of a 3D point of the second depth image is less than a predetermined threshold value to be a static area.

The foregoing and/or other aspects are achieved by providing a method of controlling an apparatus for estimating a camera pose, the method including acquiring a photographed image, acquiring motion information of the apparatus for estimating the camera pose, detecting a static area of the photographed image based on the photographed image and the motion information, and estimating a camera pose based on the detected static area.

The acquiring of the photographed image may include acquiring a first color image and a second color image or a first depth image and a second depth image.

The estimating of the camera pose may include estimating the camera pose based on corresponding points of the first color image and the second color image, or estimating the camera pose based on a pair of 3D points from a static area of the first depth image and the second depth image.

The method of controlling the apparatus for estimating the camera pose may further include outputting a control signal corresponding to the estimated camera pose.

The method of controlling the apparatus for estimating the camera pose may further include executing an application that provides an augmented reality (AR) service, wherein the outputting of the control signal corresponding to the estimated camera pose includes providing an AR service corresponding to the estimated camera pose.

The method of controlling the apparatus for estimating the camera pose may further include displaying a panoramic image having a size greater than a display screen of the apparatus for estimating the camera pose, wherein the outputting of the control signal corresponding to the estimated camera pose includes translating the displayed panoramic image corresponding to the estimated camera pose, and displaying the translated panoramic image.

The translating of the displayed panoramic image corresponding to the estimated camera pose, and the displaying of the translated panoramic image may include translating the displayed panoramic image corresponding to translation information of the estimated camera pose, and displaying the translated panoramic image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 6A and 6B illustrate a method of estimating a camera pose based on a two-dimensional (2D) color image according to example embodiments;

DETAILED DESCRIPTION

Figure 1A:
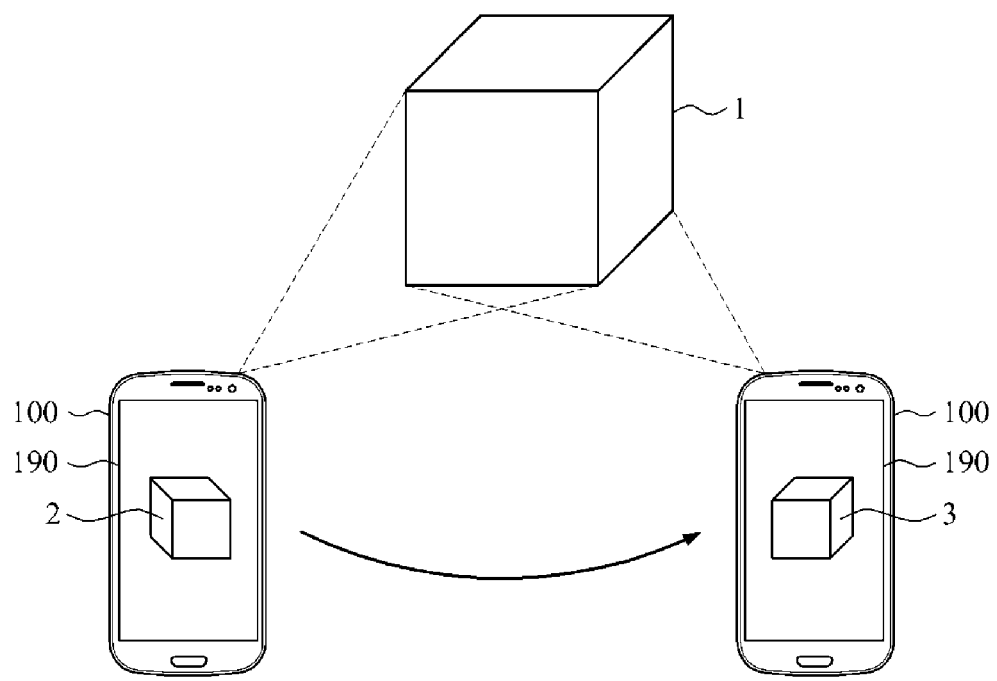
FIG. 1A illustrates an example of estimating of a camera pose according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

FIG. 1A illustrates an example of estimating of a camera pose according to example embodiments.

Referring to FIG. 1A, a subject 1 in a form of a rectangular parallelepiped is provided. Although the subject 1 is illustrated in the form of the rectangular parallelepiped in FIG. 1A, the form of the subject 1 may vary unrestrictedly.

An apparatus 100 for estimating a camera pose photographs the subject 1 at various photographing angles. For example, the apparatus 100 for estimating the camera pose includes a camera module, and photographs a panoramic view around a camera.

The apparatus 100 for estimating the camera pose photographs the subject 1 from a left side relative to the subject 1. The apparatus 100 for estimating the camera pose acquires an image including a first object 2 acquired by photographing the subject 1 from the left side. The apparatus 100 for estimating the camera pose photographs the subject 1 from a right side relative to the subject 1. The apparatus 100 for estimating the camera pose acquires an image including a second object 3 acquired by photographing the subject 1 from the right side. As shown in FIG. 1A, the image acquired by photographing the subject 1 from the left side may differ from the image acquired by photographing the subject 1 from the right side. In this sense, forms of the first object 2 and the second object 3 may differ from each other. A difference between the first object 2 acquired by photographing the subject 1 from the left side and the second object 3 acquired by photographing the subject 1 from the right side is derived from differing photographing angles of a camera with respect to the subject 1, for example, differing camera poses.

Figure 1B:
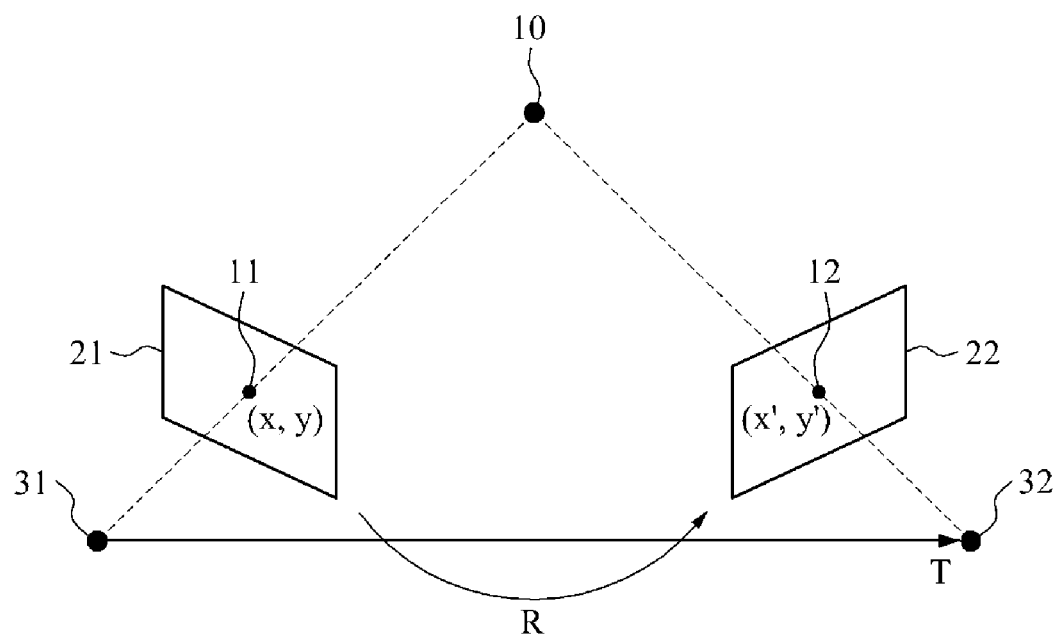
FIG. 1B illustrates an example of a difference in a camera pose caused by differing photographing angles of FIG. 1A.
Figure 1C:
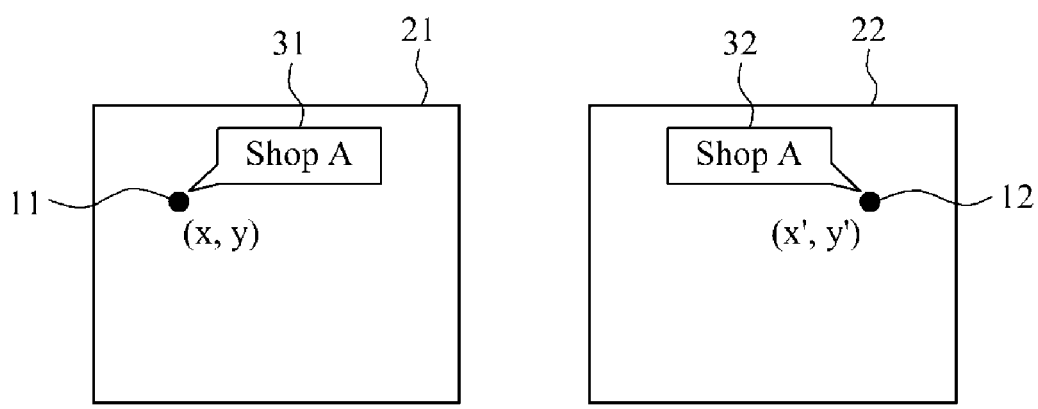
FIG. 1C illustrates an example of providing a changed augmented reality (AR) service according to example embodiments.

FIG. 1B illustrates an example of a difference in a camera pose caused by the differing photographing angles of FIG. 1A. A subject 10 is indicated by a dot for convenience in FIG. 1B. Referring to FIG. 1B, a position of a camera is translated from a first position 31 to a second position 32. The camera photographs the subject 10 at the first position 31, and acquires a first photographed image 21. The subject 10 is indicated in the first photographed image 21 using (x, y) coordinates of the first image 21. The camera photographs the subject 10 at the second position 32, and acquires a second photographed image 22. The subject 10 is indicated in the second photographed image 22 using (x', y') coordinates of the second image 22.

The apparatus 100 for estimating the camera pose estimates a rotation value "R" and a translation value "T" of the camera based on a relationship between a position 11 of a subject in the first image photographed 21 and a position 12 of a subject in the second photographed image 22.

A camera pose, for example, at least one of "R" and "T" of a camera, is estimated based on at least one of a fundamental matrix and an essential matrix. For example, the camera pose is estimated based on a matching relationship between feature points of an input image. As used herein, the term "feature point" may refer to an edge, a corner point, a blob, or a point for identifying an object.

By way of example, the apparatus 100 for estimating the camera pose may photograph an image. The apparatus 100 for estimating the camera pose may configure an initial map by extracting a sparse two-dimensional (2D) feature point.

The apparatus 100 for estimating the camera pose estimates a camera pose based on a relationship between a 2D feature point extracted from a real-time camera image and a stored 2D feature point, and when necessary, continuously expands the initial map.

The apparatus 100 for estimating the camera pose requires sufficient texture information within a scene and no change in lighting in order to extract a 2D feature point. When a moving image is included in an image, a feature point is extracted from the moving object, resulting in inaccurate estimation of the camera pose.

According to example embodiments, the apparatus 100 for estimating the camera pose generates a three-dimensional (3D) model with respect to a scene based on a 3D image cloud acquired from a depth camera. The apparatus 100 for estimating the camera pose estimates a camera pose based on relative position and direction information extracted by matching the generated 3D model and the 3D image cloud input in real time.

Figure 10:
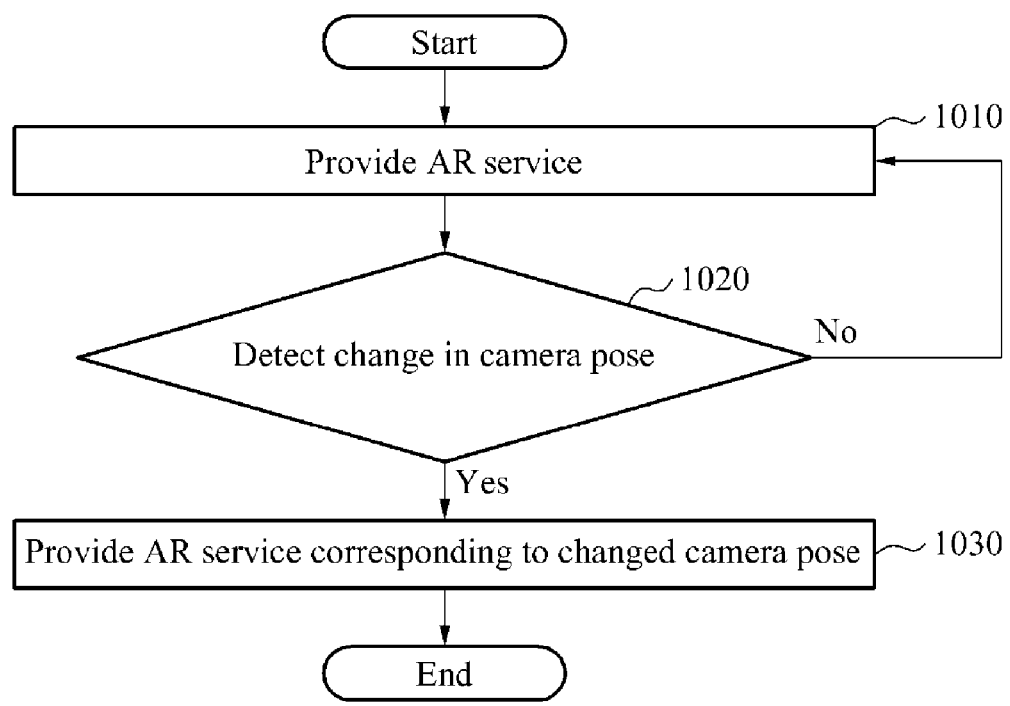
FIG. 10 illustrates a method of providing an AR service according to example embodiments.

A process of estimating a camera pose is essential to provide an augmented reality (AR) service enabling a greater degree of immersion into a reality. For example, an AR service 31 is provided corresponding to the position 11 of the subject of the first photographed image 21 as shown in FIG. 10. When the position 12 of the subject changes in the second photographed image 22, an AR service 32 also changes corresponding to the position 12 of the subject of the second photographed image 22. The AR service 31 is verified to differ from the AR service 32 when comparing the photographed images 21 and 22 of FIG. 10. As previously described, the process of estimating the camera pose is required to provide the AR service that supports a more convincing sense of reality.

Figure 2A:
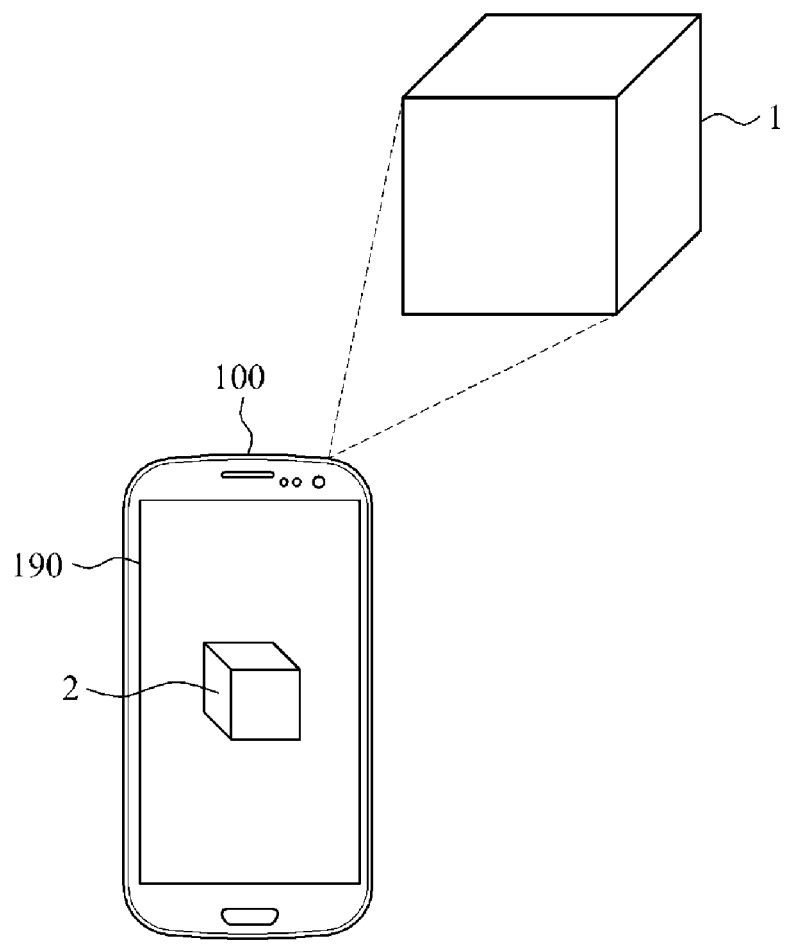
FIGS. 2A, 2B, and 2C illustrate examples of estimating a camera pose in a presence of a moving subject according to example embodiments.
Figure 2B:
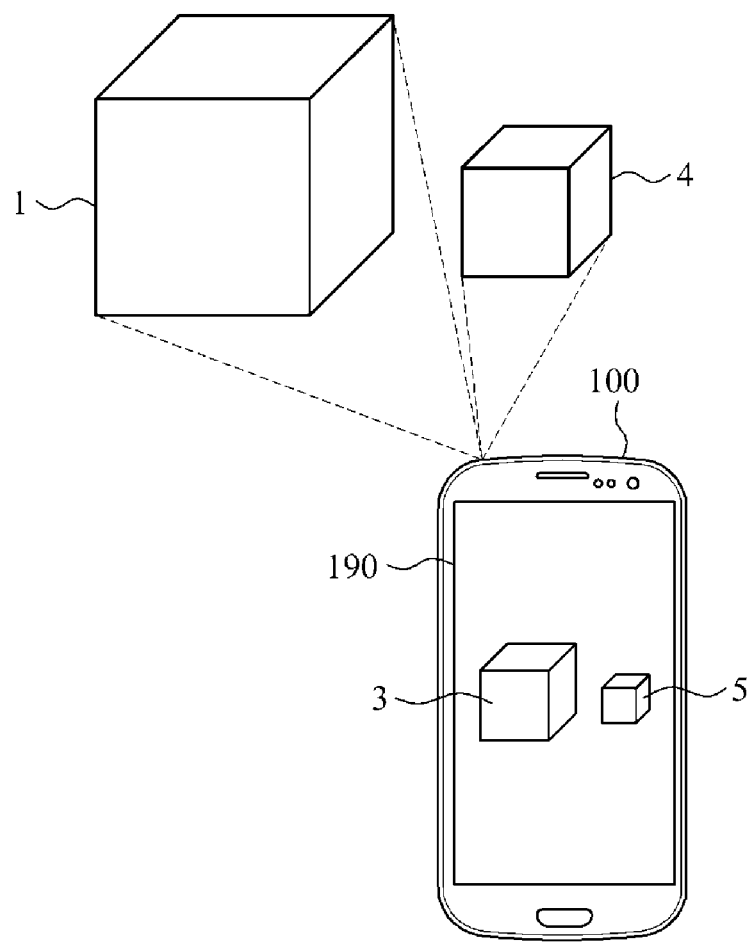
Figure 2C:
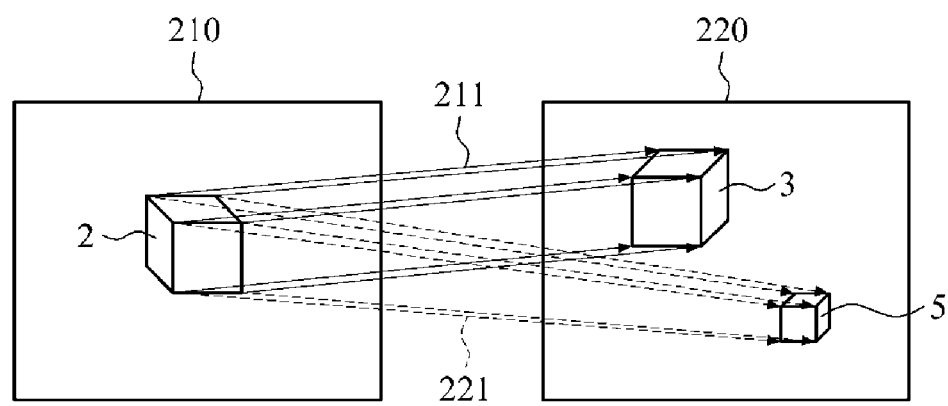

FIGS. 2A through 2C illustrate examples of estimating a camera pose in a presence of a moving subject according to example embodiments.

Referring to FIG. 2A, the apparatus 100 for estimating the camera pose photographs the subject 1 from the left side relative to the subject 1. The apparatus 100 for estimating the camera pose acquires a first image including the first object 2 acquired by photographing the subject 1 from the left side relative to the subject 1. Referring to FIG. 2B, the apparatus 100 for estimating the camera pose is translated towards the right side relative to the subject 1. The apparatus 100 for estimating the camera pose photographs the subject 1 from the right side relative to the subject 1. For example, another subject 4 is disposed during the translation of the apparatus 100 for estimating the camera pose. The apparatus 100 for estimating the camera pose acquires a second image including the second object 3 and a third object 5. In this example, the disposing of the subject 4 indicates that a moving object enters photographing angles from an area outside the photographing angles. In another example, the disposing of the subject 4 indicates that an object not photographed due to being obscured by another subject is photographed by changing a photographing angle or translating the obscured subject. By way of example, the subject 4 not photographed due to being obscured by another subject may be photographed by changing a photographing angle.

Referring to FIG. 2C, the apparatus 100 for estimating the camera pose compares a first image 210 and a second image 220. The apparatus 100 for estimating the camera pose extracts a feature point of the first object 2 of the first image 210, and extracts feature points of the second object 3 and the third object 5 of the second image 220. The apparatus 100 for estimating the camera pose performs matching 211 of the feature point of the first object 2 and the feature point of the second object 3. However, the apparatus 100 for estimating the camera pose performs matching 221 of the feature point of the first object 2 and the feature point of the third object 5. When the first object 2 is matched to the third object 5, the apparatus 100 for estimating the camera pose may inaccurately estimate a camera pose. As described above, in a presence of a moving subject, correct estimation of a camera pose may be unlikely to be successful. The same applies to a 2D color image and a depth image.

Figure 3A:
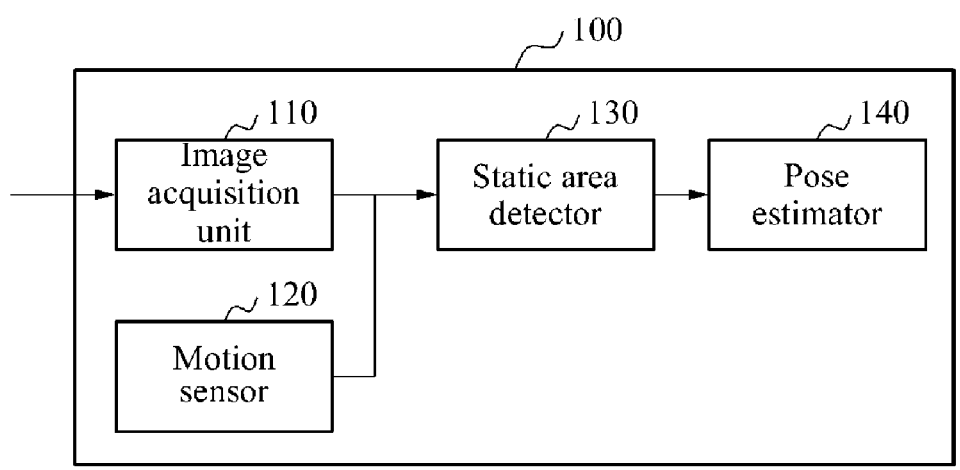
FIGS. 3A, 3B, and 3C illustrate an apparatus for estimating a camera pose according to example embodiments.

FIG. 3A illustrates the apparatus 100 for estimating the camera pose according to example embodiments.

Referring to FIG. 3A, the apparatus 100 for estimating the camera pose includes an image acquisition unit 110, a motion sensor 120, a static area detector 130, and a pose estimator 140.

The image acquisition unit 110 acquires an image acquired by photographing a subject. The image includes at least one object corresponding to the subject. The image acquisition unit 110 acquires a 2D color image or a 3D depth image.

The image acquisition unit 110 may be implemented by various photographing devices, for example, a charge-coupled device (CCD) or a photodiode to photograph a 2D color image. Alternatively, the image acquisition unit 110 may be implemented by a stereo camera module or a time of flight (TOF) camera module to photograph a 3D depth image. The image acquisition unit 110 photographs a still image or a moving image. The image acquisition unit 110 includes a subsidiary light source, for example, a flash (not shown), to provide an amount of light required for photographing. For example, the image acquisition unit 110 may be implemented by various recording devices such as a digital camera or a camcorder, that are electrically connected to the apparatus 100 for estimating the camera pose while being physically separated.

According to example embodiments, the image acquisition unit 110 may be implemented by an interface to receive a 2D color image or a depth image. For example, the 2D color image or the depth image may be stored in a storage (not shown). Alternatively, the 2D color image or the depth image may be received from an external source and temporarily stored. The image acquisition unit 110 may receive and acquire the 2D color image or the depth image from the storage or a communicator (not shown).

The motion sensor 120 senses motion information of the apparatus 100 for estimating the camera pose. For example, the motion sensor 120 includes at least one of a 3-axis linear accelerator, a gyroscope sensor, and a terrestrial magnetism sensor. The motion sensor 120 senses linear motion information of the apparatus 100 for estimating the camera pose in a 3-axis direction. The motion sensor 120 senses rotation information or pose information of the apparatus 100 for estimating the camera pose.

The static area detector 130 receives an input of a first image and a second image from the image acquisition unit 110. As described above, the first image and the second image may be a 2D color image or a depth image. The static area detector 130 detects a static area in the first image and the second image based on the first image and the second image and motion information. For example, the static area detector 130 determines the second object 3 of the second image 220 to be a static area, and the third object 5 to be a moving area. Description pertaining to the static area detector 130 detecting a static area based on an image and motion information will be provided later.

The pose estimator 140 estimates a camera pose based on the detected static area of the first image and the second image. For example, the pose estimator 140 matches the first object 2 and the second object 3 detected to be the static area, and estimates the camera pose from the matching relationship. When the first image and the second image are 2D color images, the pose estimator 140 calculates at least one of a fundamental matrix and an essential matrix from the matching relationship, and based on the calculation, estimates the camera pose. When the first image and the second image are depth images, the pose estimator 140 estimates the camera pose based on a matching relationship in a pair of 3D points.

Figure 3B:
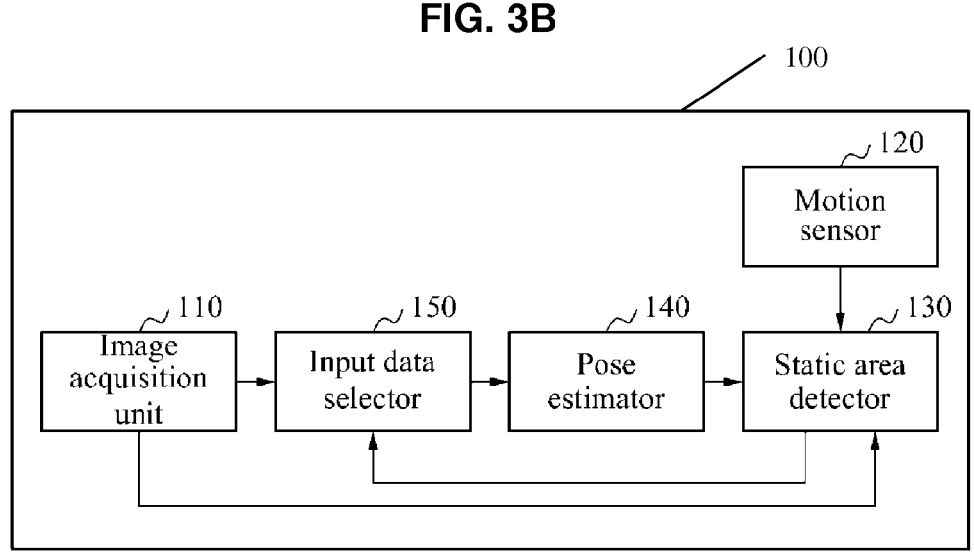

FIG. 3B illustrates the apparatus 100 for estimating the camera pose according to example embodiments. Referring to FIG. 3B, the apparatus 100 for estimating the camera pose further includes an input data selector 150.

The input data selector 150 outputs input data corresponding to the static area detected from the static area detector 130 to the pose estimator 140. The input data selector 150 does not output input data not corresponding to an area detected to be a moving area to the pose estimator 140.

Figure 3C:
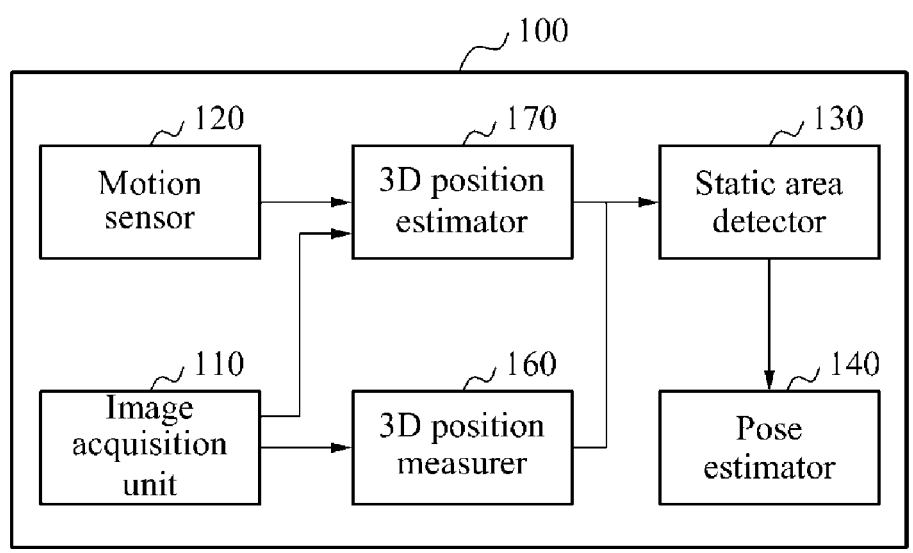

FIG. 3C illustrates the apparatus 100 for estimating the camera pose according to example embodiments. Referring to FIG. 3C, the apparatus 100 for estimating the camera pose may process a depth image.

A 3D position measurer 160 measures a 3D position from a depth image input from the image acquisition unit 110. A 3D position estimator 170 estimates a 3D position based on a depth image and motion information. For example, the 3D position estimator 170 estimates a 3D position in a depth image of a subsequent frame based on a rotation value estimated from the motion information.

The static area detector 130 detects a static area based on a result of comparison between the estimated 3D position and an actual 3D position. The pose estimator 140 estimates a camera pose based on the detected static area.

Figure 4:
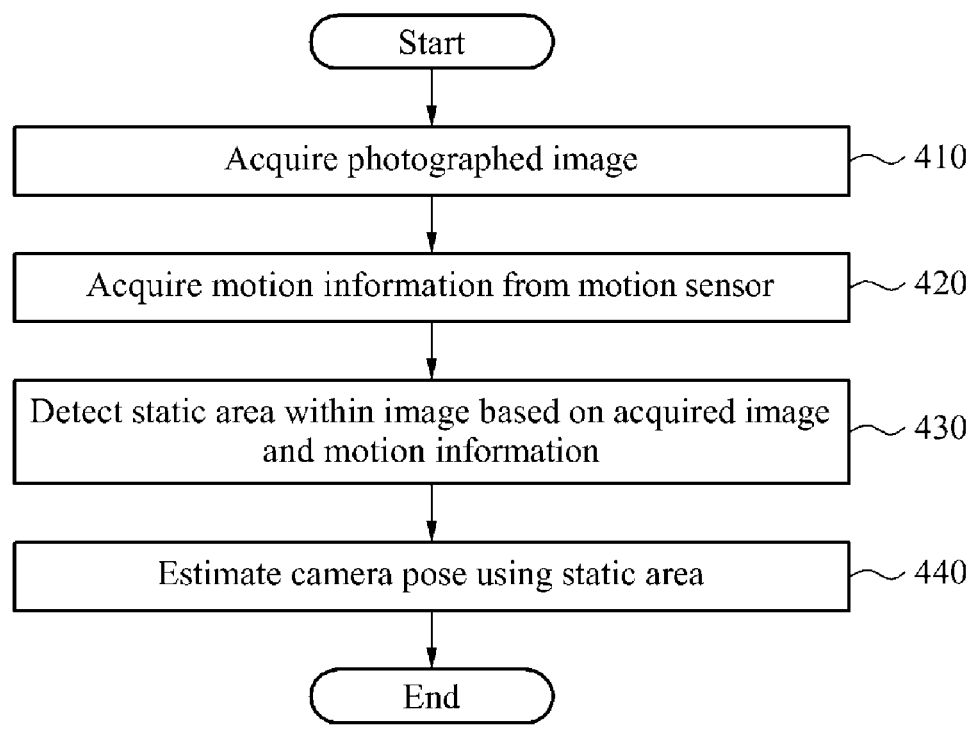
FIG. 4 illustrates a method of estimating a camera pose according to example embodiments.

FIG. 4 illustrates a method of estimating a camera pose according to example embodiments.

In operation 410, the apparatus 100 for estimating the camera pose acquires a photographed image. The photographed image may be a 2D color image or a depth image. For example, the apparatus 100 for estimating the camera pose acquires a first image and a second image. In this example, the first image and the second image may be images configuring neighboring image frames.

In operation 420, the apparatus 100 for estimating the camera pose acquires motion information of the apparatus 100 for estimating the camera pose from a motion sensor. The motion information includes at least one of translation information, rotation information, and pose information of the apparatus 100 for estimating the camera pose.

In operation 430, the apparatus 100 for estimating the camera pose detects a static area within an image based on the acquired image and the motion information. For example, the apparatus 100 for estimating the camera pose detects the static area based on a result of comparison between the first image and the second image and the motion information. The apparatus 100 for estimating the camera pose detects a static area and a moving area of the first image. The apparatus 100 for estimating the camera pose detects a static area and a moving area of the second image.

In operation 440, the apparatus 100 for estimating the camera pose estimates a camera pose based on the static area. For example, the apparatus 100 for estimating the camera pose estimates the camera pose by comparing the static area of the first image and the static area of the second image.

Figure 5A:
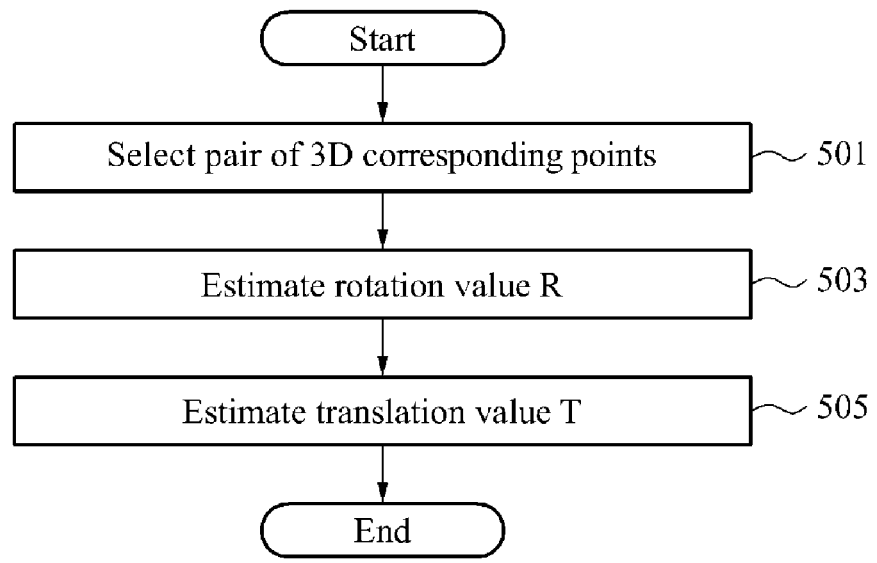
FIGS. 5A and 5B illustrate a method of estimating a camera pose using a depth image according to example embodiments.
Figure 5B:
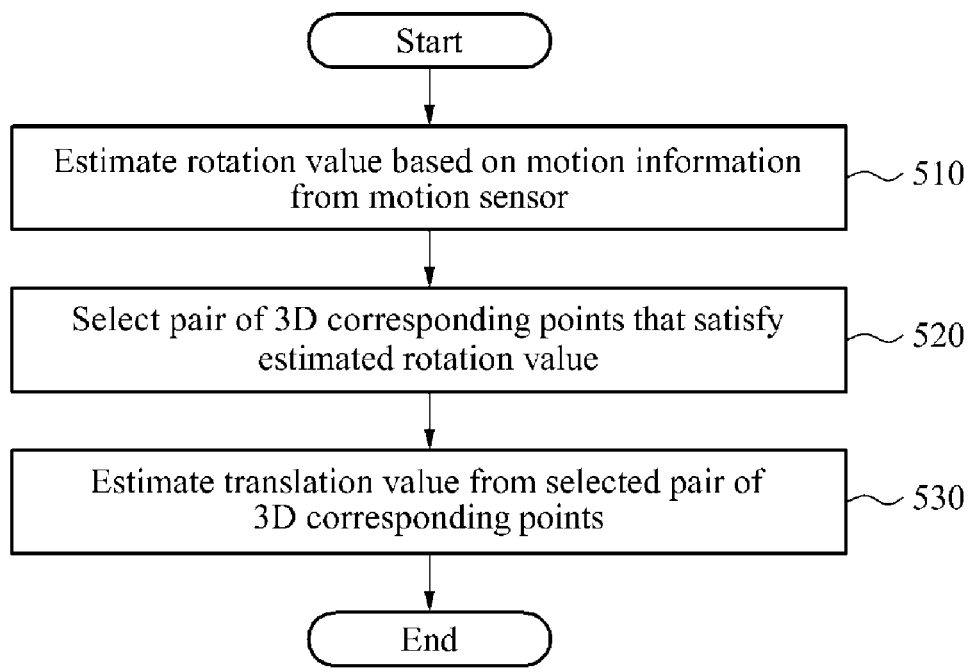

FIGS. 5A and 5B illustrate a method of estimating a camera pose using a depth image according to example embodiments.

FIG. 5A illustrates a method of estimating a camera pose according to a comparative example.

In operation 501, the method of estimating the camera pose according to the comparative example includes selecting a pair of 3D corresponding points from a first depth image and a second depth image. In operation 503, the method of estimating the camera pose according to the comparative example includes estimating a rotation value based on the selected pair of 3D corresponding points. For example, in the method of estimating the camera pose according to the comparative example, the rotation value may be estimated based on Equation 1.

$$\sum{}^2 = \sum_{i=1}^{n} \|q_i^x - Rq_i\|^2 \qquad \text{[Equation 1]}$$

In Equation 1, qi and qi' may be represented by "pi−c" and "pi'−c". pi and pi' denote a point of a first depth image and a point of a second depth image, respectively. pi corresponds to an i-th point of the first depth image, and pi' corresponds to a point corresponding to pi in the second depth image. c and c' are expressed by Equation 2. As used herein, "i" is an ordinal number referring to an i-th depth image.

$$c = \frac{1}{n}\sum_{i=1}^{n} p_i, \, c' = \frac{1}{n}\sum_{i=1}^{n} p_i' \qquad \text{[Equation 2]}$$

In Equation 2, c and c' denote a center point of the point pi in the first depth image, and a center point of the point pi' in the second depth image, respectively. "n" denotes a number of corresponding points between the first depth image and the second depth image. $\Sigma''$ of Equation 1 denotes a square of a distance between a pair of points in the first depth image and the second depth image.

R denotes rotation information. In the method of estimating the camera pose according to the comparative example, the rotation information is estimated based on Equation 1.

In operation 505, the method of estimating the camera pose according to the comparative example includes estimating translation information. For example, in the method of estimating the camera pose according to the comparative example, the translation information is estimated based on Equation 3.

$$\hat{T} = p' - \hat{R}p \qquad \text{[Equation 3]}$$

In Equation 3, $\hat{T}$ denotes translation information, $\hat{R}$ and denotes rotation information. In Equation 2, pi and pi' denote a point of a first depth image and a point of a second depth image, respectively.

However, in the method of estimating the camera pose according to the comparative example, a matching relationship may be inaccurate when a moving object is included during a process of estimating a rotation.

FIG. 5B illustrates a method of estimating a camera pose according to example embodiments.

In operation 510, the apparatus 100 for estimating the camera pose estimates a rotation value based on sensing data of a motion sensor. For example, the apparatus 100 for estimating the camera pose estimates a rotation value of the apparatus 100 for estimating the camera pose based on sensing data from at least one of a gyroscope sensor and a terrestrial magnetism sensor of the motion sensor.

In operation 520, the apparatus 100 for estimating the camera pose selects a pair of 3D points that satisfies the estimated rotation value. As used herein, the term "pair of 3D points" refers to a pair including a 3D point of a first depth image and a 3D point of a second depth image. The apparatus 100 for estimating the camera pose detects an area corresponding to the pair of the 3D points that satisfies the estimated rotation value to be a static area.

In operation 530, the apparatus 100 for estimating the camera pose estimates a translation value based on the selected pair of the 3D points. For example, the apparatus 100 for estimating the camera pose estimates the translation value based on Equation 2.

The apparatus 100 for estimating the camera pose re-calculates the rotation value and the translation value based on the selected pair of the 3D points.

As described above, the apparatus 100 for estimating the camera pose estimates a camera pose by estimating the rotation value and the translation value.

Figure 6A:
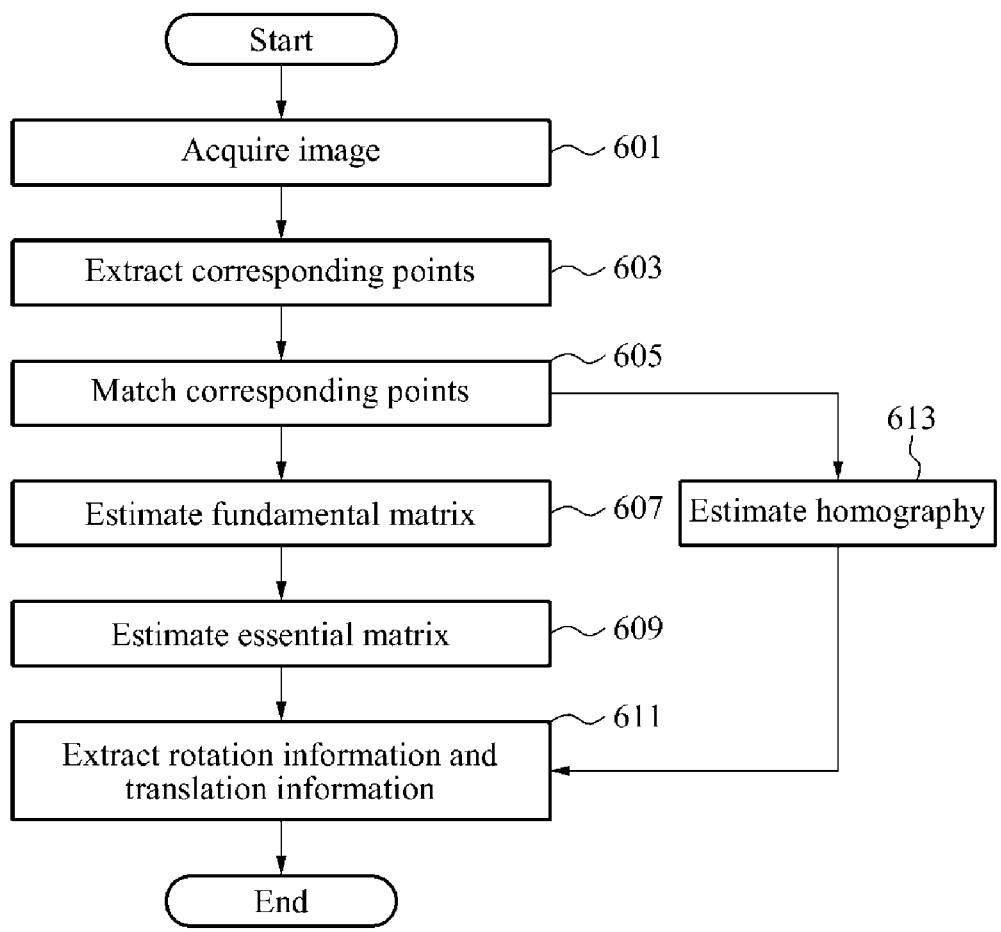

FIGS. 6A and 6B illustrate a method of estimating a camera pose based on a 2D color image according to example embodiments.

FIG. 6A illustrates a method of estimating a camera pose according to a comparative example.

In operation 601, the method of estimating the camera pose according to the comparative example includes acquiring an image. For example, in the method of estimating the camera pose according to the comparative example, a first color image and a second color image may be acquired.

In operation 603, the method of estimating the camera pose according to the comparative example includes extracting corresponding points between the first color image and the second color image, and matching the corresponding points in operation 605.

In operations 607 and 609, the method of estimating the camera pose according to the comparative example includes estimating a fundamental matrix and an essential matrix based on the matching relationship. In operation 611, the method of estimating the camera pose according to the comparative example includes extracting rotation information and translation information based on the essential matrix. When a subject is a planar subject, the method of estimating the camera pose according to the comparative example includes estimating a homography in operation 613.

The method of estimating the camera pose according to the comparative example is at a disadvantage in that an error may be likely to occur in the matching of the corresponding points in operation 605 in a presence of a moving object in an image.

FIG. 6B illustrates a method of controlling an apparatus for estimating a camera pose according to example embodiments.

In operation 621, the apparatus 100 for estimating the camera pose acquires a 2D color image. For example, the apparatus 100 for estimating the camera pose acquires a first color image and a second color image.

In operation 623, the apparatus 100 for estimating the camera pose extracts corresponding points between the first color image and the second color image, and matches the corresponding points in operation 625.

In operation 631, the apparatus 100 for estimating the camera pose acquires motion information input from the motion sensor 120. In operation 633, the apparatus 100 for estimating the camera pose estimates a rotation value based on the motion information. In operation 635, the apparatus 100 for estimating the camera pose performs calibration on the estimated rotation value.

For example, a position of a photographing device, such as a camera module may differ from a position of a sensor module, such as a gyroscope. Accordingly, rotation information at the position of the gyroscope may be calibrated to rotation information at the position of the camera module. The apparatus 100 for estimating the camera pose predetermines the position of the camera module and the position of the sensor module, and performs the calibration correspondingly. As a result, the apparatus 100 for estimating the camera pose acquires the calibrated rotation information.

In operation 641, the apparatus 100 for estimating the camera pose calculates an essential matrix based on a matching relationship and calibrated rotation information. In operation 643, the apparatus 100 for estimating the camera pose estimates translation information based on the calculated essential matrix.

In operation 645, the apparatus 100 for estimating the camera pose removes a moving area based on the estimated rotation information and the estimated translation information, and detects a static area. Descriptions pertaining to the removing of the moving area will be provided with reference to FIG. 7A.

In operation 647, the apparatus 100 for estimating the camera pose re-calculates the rotation information and the translation information based on the static area. For example, the apparatus 100 for estimating the camera pose extracts corresponding points between a static area of the first color image and a static area of the second color image, matches the corresponding points, and calculates the essential matrix based on the matched corresponding points. The apparatus 100 for estimating the camera pose estimates a camera pose of a higher quality based on the calculated essential matrix.

Figure 7A:
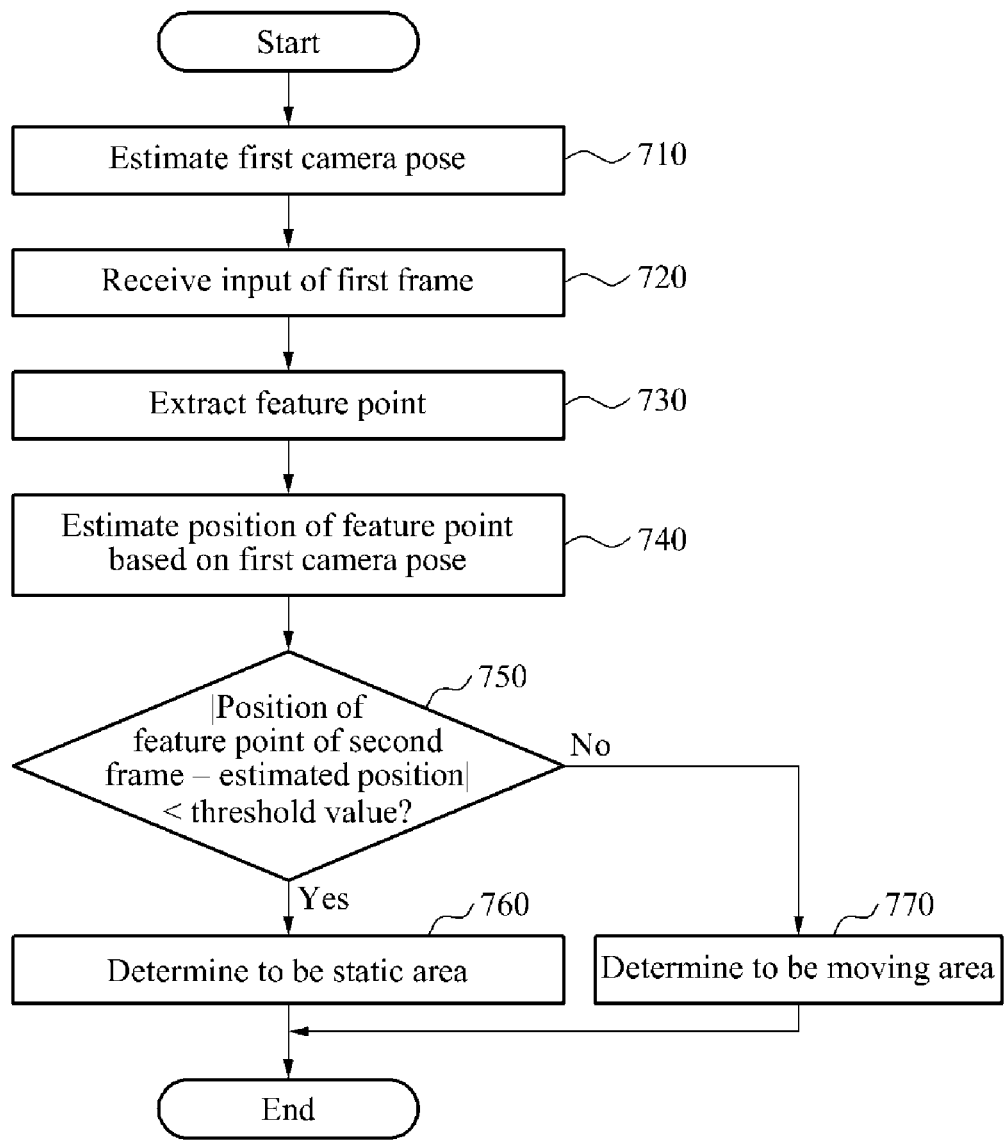
FIGS. 7A and 7B illustrate a method of detecting a static area according to example embodiments.
Figure 7B:
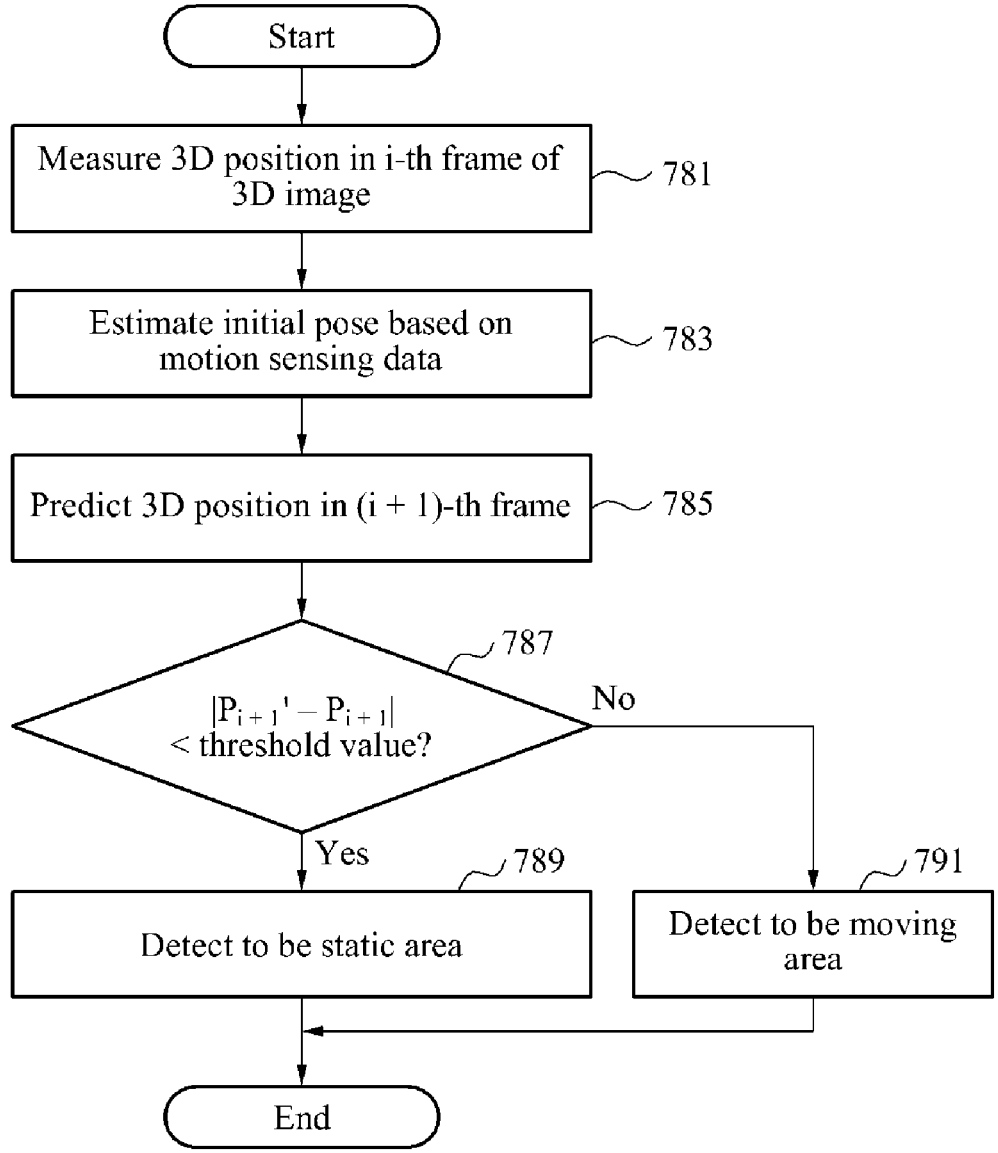
Figure 8A:
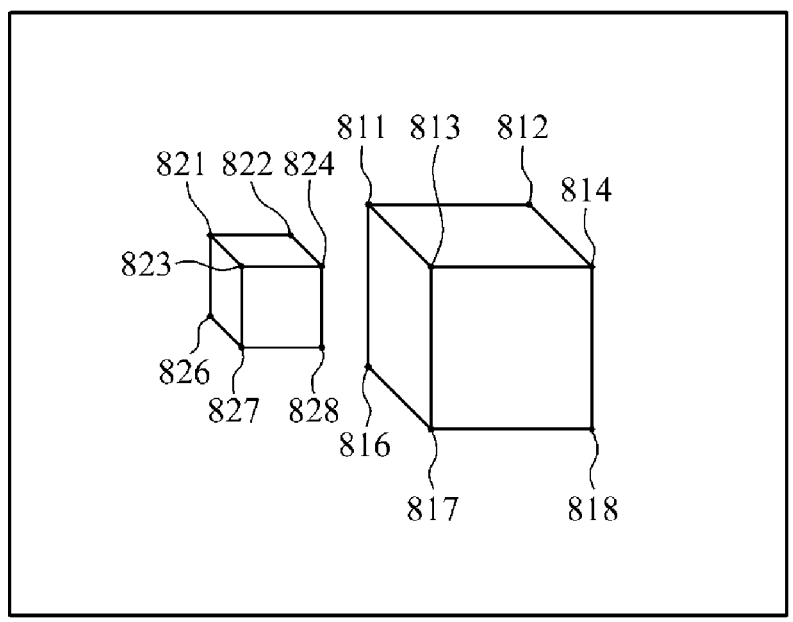
FIGS. 8A, 8B, and 8C illustrate an image or an image at a predicted position according to example embodiments.
Figure 8B:
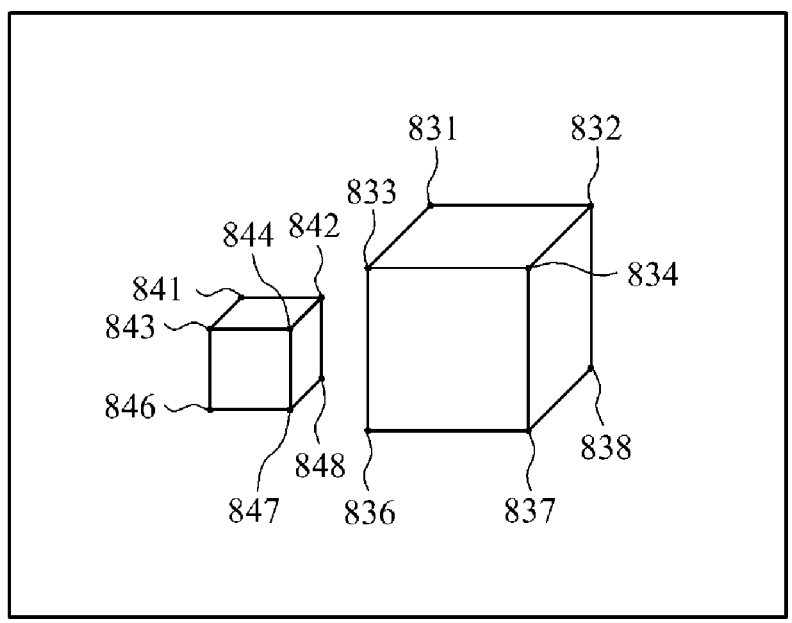
Figure 8C:
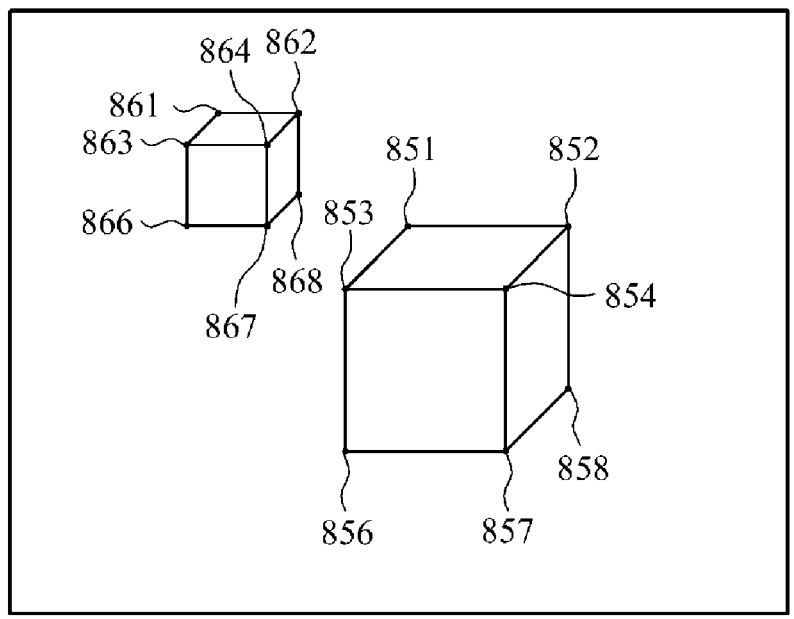

FIGS. 7A and 7B illustrate a method of detecting a static area according to example embodiments. The method of detecting the static area of FIG. 7A will be discussed later with reference to FIGS. 8A through 8C. FIGS. 8A through 8C illustrate an image or an image at a predicted position according to example embodiments.

In operation 710, the method of detecting the static area includes estimating an initial camera pose, for example, a first camera pose. The method of detecting the static area includes acquiring a plurality of 2D color images, and estimating the initial camera pose by comparing the plurality of 2D color images. For example, in the method of detecting the static area, the first camera pose may be estimated based on a rough matching relationship, rotation information input from a motion sensor, or calibrated rotation information.

In operation 720, the method of detecting the static area includes receiving an input of a first color image, and in operation 730, includes extracting a feature point from the first color image.

For example, the method of detecting the static area includes receiving an input of a first color image of FIG. 8A. The first color image includes feature points 811, 812, 813, 814, 816, 817, and 818, and feature points 821, 822, 823, 824, 826, 827, and 828. The method of detecting the static area includes extracting the feature points 811, 812, 813, 814, 816, 817, and 818, and the feature points 821, 822, 823, 824, 826, 827, and 828.

In operation 740, the method of detecting the static area includes estimating a position of a feature point of a second color image based on the first camera pose.

FIG. 8B illustrates a predicted position of a feature point based on the method of detecting the static area according to example embodiments. Referring to FIG. 8B, an image at a predicted position includes predicted feature points 831, 832, 833, 834, 836, 837, and 838, and predicted feature points 841, 842, 843, 844, 846, 847, and 848. In this example, the predicted feature points 831, 832, 833, 834, 836, 837, and 838 correspond to predicted positions of the feature points 811 through 818 of FIG. 8A. The predicted feature points 841, 842, 843, 844, 846, 847, and 848 correspond to predicted positions of the feature points 821, 822, 823, 824, 826, 827, and 828 of FIG. 8A.

In operation 750, the method of detecting the static area includes determining whether a difference between the position of the feature point of the second color image and a predicted position is less than a predetermined threshold value. When the difference between the position of the feature point of the second color image and the predicted position is less than the predetermined threshold value, an area corresponding to the feature point of the second color image is determined to be a static area in operation 760. When the difference between the position of the feature point of the second color image and the predicted position is greater than the predetermined threshold value, an area corresponding to the feature point is determined to be a moving area in operation 770.

For example, FIG. 8C illustrates the second color image. The second color image includes feature points 851, 852, 853, 854, 856, 857, and 858, and feature points 861, 862, 863, 864, 866, 867, and 868. For one example, the method of detecting the static area includes calculating a distance between the feature point 851 of the second color image and the predicted feature point 831, and determining whether a result of the calculation is less than a predetermined threshold value. When the distance between the feature point 851 and the predicted feature point 831 is determined to be less than the predetermined threshold value as the result of the calculation, the method of detecting the static area includes determining an area corresponding to the feature point 851 to be a static area.

For another example, the method of detecting the static area includes calculating a distance between the feature point 861 of the second color image and the predicted feature point 841, and determining whether a result of the calculation is less than a predetermined threshold value. When the distance between the feature point 861 and the predicted feature point 841 is determined to be greater than the predetermined threshold value as the result of the calculation, the method of detecting the static area includes determining an area corresponding to the feature point 861 to be a moving area.

As described above, in the method of detecting the static area, a static area may be detected to be used for estimating a camera pose, and a moving area may be omitted from the estimating of the camera pose.

FIG. 7B illustrates a method of detecting a static area using a depth image.

In operation 781, the method of detecting the static area includes measuring a 3D position of a predetermined object in an i-th depth image. In operation 783, the method of detecting the static area includes estimating an initial pose of a camera based on motion information input from a motion sensor.

In operation 785, the method of detecting the static area includes estimating a 3D position in an (i+1)-th depth image based on the 3D position in the predetermined object of the i-th depth image and the initial pose of the camera.

In operation 787, the method of detecting the static area includes determining whether a distance between the estimated 3D position ($P_{i+1}'$) in the (i+1)-th depth image and an actual 3D position ($P_{i+1}$) in the (i+1)-th depth image is less than a predetermined threshold value.

When the distance $|P_{i+1}'-P_{i+1}|$ between the estimated 3D position ($P_{i+1}'$) in the (i+1)-th depth image and the actual 3D position in the (i+1)-th depth image is less than the predetermined threshold value, an area corresponding to the (i+1)-th depth image is determined to be a static area in operation 789. When the distance IP, $|P_{i+1}'-P_{i+1}|$ between the estimated 3D position ($P_{i+1}'$) in the (i+1)-th depth image and the actual 3D position in the (i+1)-th depth image is greater than the predetermined threshold value, an area corresponding to the (i+1)-th depth image is determined to be a moving area in operation 791.

Those skilled in the art may perform the detecting of the static area and the estimating of the camera pose according to example embodiments using a depth image along with a color image. Therefore, it would be appreciated that a static area is detected according to example embodiments when a first image is a color image and a second image is a depth image.

Figure 9:
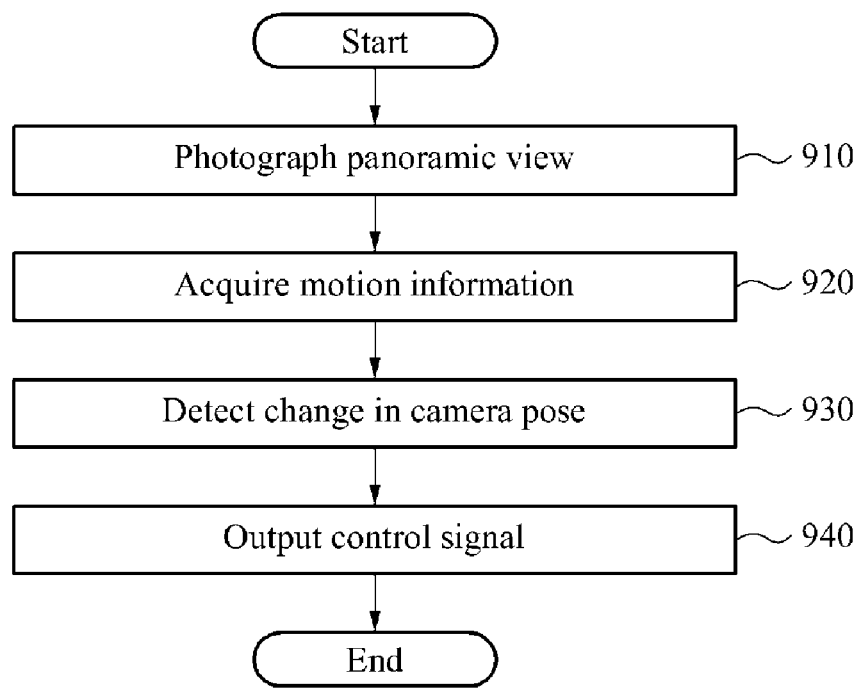
FIG. 9 illustrates a method of estimating a camera pose according to example embodiments.

FIG. 9 illustrates a method of estimating a camera pose according to example embodiments.

In operation 910, the method of estimating the camera pose includes acquiring a plurality of images by photographing a panoramic view.

In operation 920, the method of estimating the camera pose includes acquiring motion information.

In operation 930, the method of estimating the camera pose includes estimating a camera pose, and detecting a change in the camera pose. For example, in the method of estimating the camera pose, the camera pose may be estimated, and the change in the camera pose may be detected according to the aforementioned example embodiments.

In operation 940, the method of estimating the camera pose includes outputting a control signal corresponding to the change in the camera pose. In this example, the control signal may be used as a control signal of various applications, such as for providing a changed AR service or translating a panoramic image displaying portion. The camera pose estimated according to example embodiments may be used as a control signal for an application that does not photograph an image. For example, a gallery application for displaying a panoramic image may be executed. A conventional gallery application does not photograph a panoramic view. However, the gallery application according to example embodiments estimates a camera pose based on a photographed image of a panoramic view and motion information. The gallery application according to example embodiments changes a panoramic image displaying portion corresponding to a change in the estimated camera pose. Translation information of an electric device may be acquired from the estimated camera pose, and controlling various applications may be possible based on the translation information.

FIG. 10 illustrates a method of providing an AR service according to example embodiments.

Figure 11:
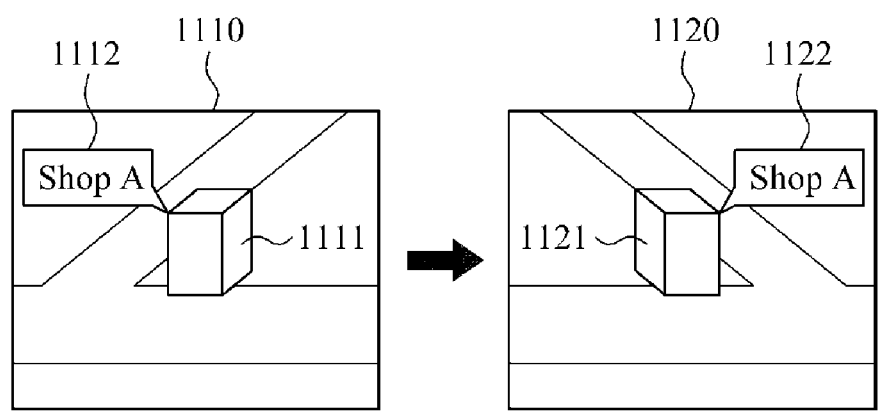
FIG. 11 illustrates an example of providing an AR service according to example embodiments.

In operation 1010, the method includes providing an AR service. For example, in the method of providing the AR service, a first image 1110 of FIG. 11 is displayed. The first image 1110 includes a first object 1111 and an AR service 1112.

In operation 1020, the method of providing the AR service includes estimating a camera pose, and determining whether a change is detected in the estimated camera pose. For example, in the method of providing the AR service, a panoramic view is photographed, and a camera pose is estimated based on the photographed image of the panoramic view and motion information acquired from a motion sensor.

In operation 1030, the method of providing the AR service includes providing an AR service corresponding to the changed camera pose. For example, in the method of providing the AR service, the camera pose being rotated or translated towards a left direction is detected. Accordingly, the method of providing the AR service includes displaying a second image 1120 as shown in FIG. 11. A first object 1121 of the second image 1120 is translated to a left side relative to the second image 1120, and in response to the translation, the method of providing the AR service performs displaying an AR service 1122 that indicates the left side relative to the second image 1120.

Figure 12:
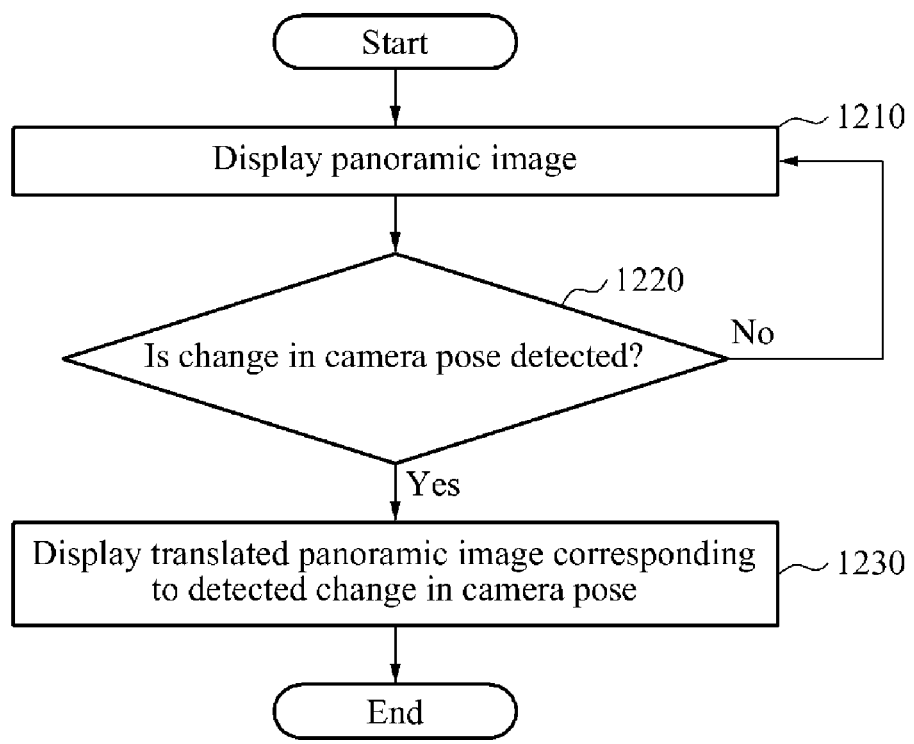
FIG. 12 illustrates a method of displaying a panoramic image according to example embodiments.

FIG. 12 illustrates a method of displaying a panoramic image according to example embodiments. Description pertaining to the panoramic image will be provided with reference to FIGS. 13A and 13B.

Figure 13A:
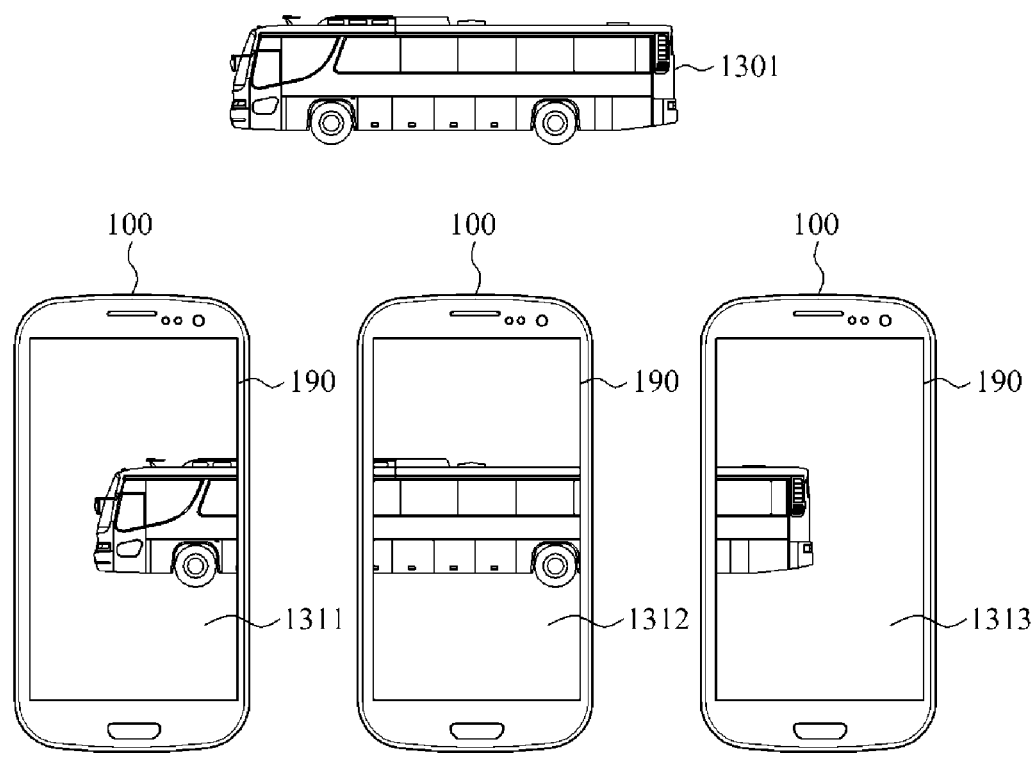
FIGS. 13A and 13B illustrate a panoramic image according to example embodiments.
Figure 13B:
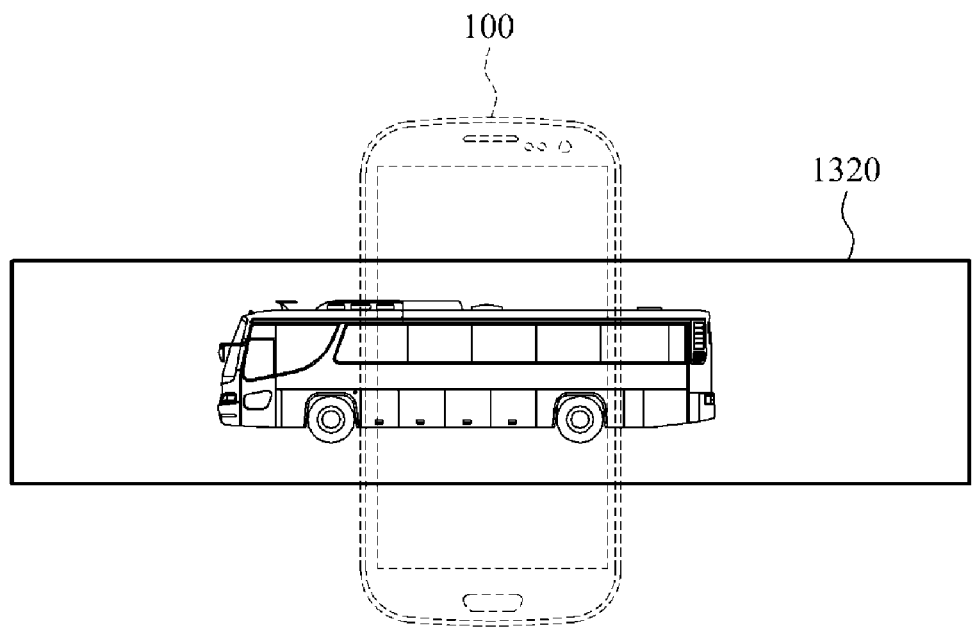

Referring to FIG. 13A, when a subject 1301 is photographed, the entire subject 1301 is not displayed within a display unit 190 of an apparatus 100 for displaying a panoramic image. In this instance, a user photographs an image by translating the apparatus for displaying the panoramic image, and acquires a plurality of images, for example, first image 1311 through n-th image 1313. The apparatus for displaying the panoramic image combines a photographed portion of the images, for example, the plurality of images 1311 through 1313, to generate a single panoramic image 1320, and displays a portion of the panoramic image 1320.

In operation 1210, the method of displaying the panoramic image includes displaying a first portion of a panoramic image. For example, in the method of displaying the panoramic image, a first portion 1321 is displayed as shown in FIG. 13C.

When the user wishes to view a relatively right portion of the panoramic image, the user translates the apparatus for displaying the panoramic image to right.

In operation 1220, the method of displaying the panoramic image includes detecting a change in a camera pose. In the method of displaying the panoramic image, a panoramic view is photographed, a camera pose is estimated based on the photographed image and motion information input from a motion sensor, and a change in the camera pose is detected. As described above, in the method of displaying the panoramic image, when the user translates the apparatus for displaying the panoramic image to right, the camera pose being translated to right is detected. The method of displaying the panoramic image according to example embodiments enables an accurate detection of the translation because a camera pose may be estimated without an error in a presence of a moving subject in a foreground. When the user translates the apparatus for displaying the panoramic image at a uniform velocity, a degree of the translation may be accurately detected.

Figure 13C:
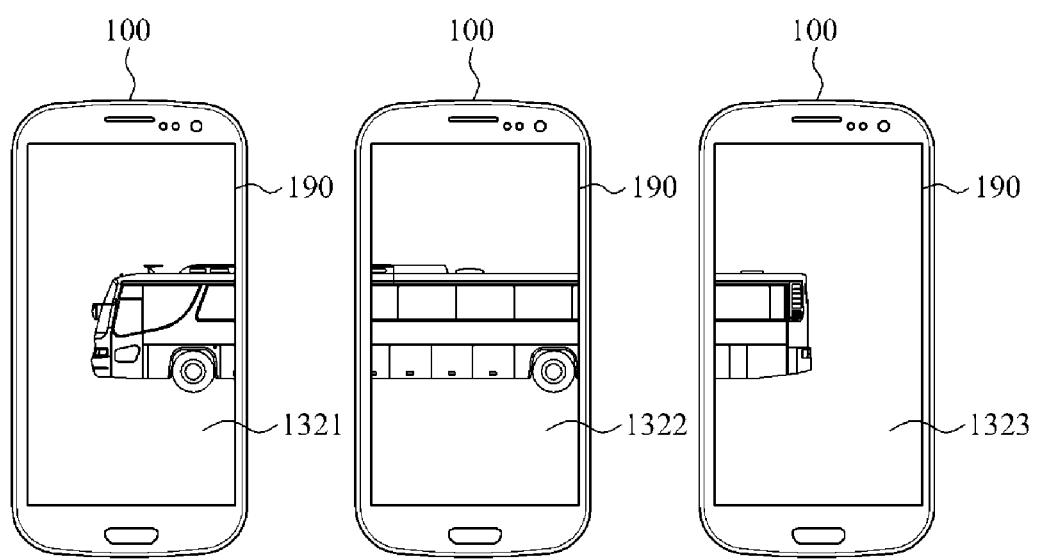
FIG. 13C illustrates a method of displaying a panoramic image according to example embodiments.

In operation 1230, the method of displaying the panoramic image includes translating a portion displayed corresponding to the detected change in the camera pose to a second portion 1322 and a third portion 1323, and displaying the translated portion as shown in FIG. 13C.

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An apparatus for estimating a camera pose, the apparatus comprising:
an image acquisition unit configured to acquire a first image and a second image;
a motion sensor configured to acquire motion information of the apparatus;
a processor implemented static area detector configured to
detect a position of a first point of the first image and a position of a second point of the second image,
determine a predicted position of the second point based on the detected position of the first point and the motion information, and determine an area of the second image to be a static area in response to a difference between the predicted position of the second point and the detected position of the second point being less than a threshold; and a pose estimator configured to estimate the camera pose based on the determined static area.

2. The apparatus of claim 1, wherein the first image is a first color image and the second image is a second color image.

3. The apparatus of claim 2, wherein the pose estimator is configured to:

match corresponding points between the first image and the second image; and estimate a rotation value from the motion information.

4. The apparatus of claim 3, wherein the pose estimator is configured to calibrate the estimated rotation value to correspond to a disposition in which the camera is considered to be at a position identical to the motion sensor.

5. The apparatus of claim 3, wherein the pose estimator is configured to:

calculate an essential matrix based on a matching relationship between the matched corresponding points and the estimated rotation value; and estimate a translation value based on the calculated essential matrix.

6. The apparatus of claim 5, wherein the static area detector is configured to determine the static area based on the estimated rotation value and the estimated translation value.

7. The apparatus of claim 6, wherein the static area detector is configured to:

apply the estimated rotation value and the estimated translation value to the first point of the first image; and predict the position of the second point of the second image.

8. An apparatus for estimating a camera pose, the apparatus comprising:

an image acquisition unit to acquire a photographed image;

a motion sensor to acquire motion information of the apparatus for estimating the camera pose;

a static area detector to detect a static area of the photographed image based on the photographed image and the motion information; and a pose estimator to estimate the camera pose based on the detected static area, wherein the image acquisition unit acquires a first color image and a second color image, wherein the pose estimator matches corresponding points between the first color image and the second color image, estimates a rotation value from the motion information, calibrates the estimated rotation value to correspond to a disposition in which the camera is at a position identical to the motion sensor, calculates an essential matrix based on a matching relationship between the matched corresponding points and the estimated rotation value, estimates a translation value based on the calculated essential matrix, wherein the static area detector applies the estimated rotation value and the estimated translation value to the corresponding point of the first color image, detects a predicted position of the corresponding point of the second color image, and detects an area in which a difference between the predicted position of the corresponding point of the second color image and an actual position of the corresponding point of the second color image is less than a predetermined threshold value to be the static area.

9. The apparatus of claim 1, wherein the image acquisition unit is configured to acquire a first depth image and a second depth image respectively as the first image and the second image.

10. The apparatus of claim 9, wherein the pose estimator is configured to select a pair of three-dimensional (3D) points from the first depth image and the second depth image that satisfies the motion information acquired from the motion sensor.

11. The apparatus of claim 10, wherein the pose estimator is configured to estimate a translation value based on the selected pair of 3D points.

12. The apparatus of claim 11, wherein the static area detector is configured to:

apply a rotation value and the translation value to a 3D point of the first depth image; and estimate a predicted position of a 3D point of the second depth image.

13. The apparatus of claim 12, wherein the rotation value is estimated from the motion information.

14. An apparatus for estimating a camera pose, the apparatus comprising:

an image acquisition unit to acquire a photographed image;

a motion sensor to acquire motion information of the apparatus for estimating the camera pose;

a static area detector to detect a static area of the photographed image based on the photographed image and the motion information; and a pose estimator to estimate the camera pose based on the detected static area, wherein the image acquisition unit acquires a first depth image and a second depth image, wherein the pose estimator selects a pair of three-dimensional (3D) points from the first depth image and the second depth image that satisfies the motion information acquired from the motion sensor, and estimates a translation value based on the selected pair of 3D points, and wherein the static area detector applies a rotation value and the translation value to a 3D point of the first depth image, and estimates a predicted position of a 3D point of the second depth image, and wherein the static area detector detects an area in which a difference between the predicted position of the 3D point of the second depth image and an actual position of a 3D point of the second depth image is less than a predetermined threshold value to be the static area.

15. The apparatus of claim 14, wherein the rotation value is estimated from the motion information.

16. A processor implemented method of controlling an apparatus for estimating a camera pose, the method comprising:

detecting a position of a first point of an acquired first image and a position of a second point of an acquired second image;

determining a predicted position of the second point based on the detected position of the first point and acquired motion information from a motion sensor;

determining an area of the second image to be a static area in response to a difference between the predicted position of the second point and the detected position of the second point being less than a threshold; and estimating the camera pose based on the determined static area.

17. The method of claim 16, wherein the acquired first image and the acquired second image are an image pair respectively as a first color image and a second color image, or a depth image pair respectively as a first depth image and a second depth image.

18. The method of claim 17, wherein the estimating of the camera pose is based on:

corresponding points of the first color image and the second color image, or a pair of three-dimensional (3D) points from the static area based on the first depth image and the second depth image.

19. The method of claim 16, further comprising:

outputting a control signal corresponding to the estimated camera pose.

20. The method of claim 19, further comprising:

executing an application that provides an augmented reality (AR) service, wherein the outputting of the control signal corresponding to the estimated camera pose comprises:

providing an AR service corresponding to the estimated camera pose.

21. The method of claim 19, further comprising:

displaying a panoramic image having a size greater than a display screen of the apparatus for estimating the camera pose, wherein the outputting of the control signal corresponding to the estimated camera pose comprises:

translating the displayed panoramic image corresponding to the estimated camera pose, and displaying the translated panoramic image.

22. The method of claim 21, wherein the translating of the displayed panoramic image corresponding to the estimated camera pose comprises:

translating the displayed panoramic image corresponding to translation information of the estimated camera pose.

23. The method of claim 16, further comprising acquiring the first image and the second image captured by at least one camera of a device;

acquiring the motion information provided by the motion sensor configured to detect motion of the device.

* * * * *